United States Patent
Kobayashi

(10) Patent No.: US 8,453,394 B2
(45) Date of Patent: Jun. 4, 2013

(54) SOLAR CELL MODULE SECURING STRUCTURE

(75) Inventor: Shuichi Kobayashi, Takahama (JP)

(73) Assignee: Yanegijutsukenkyujo Co., Ltd., Takahama-shi, Aichi (JP)

( * ) Notice: Subject to any disclaimer, the term of this patent is extended or adjusted under 35 U.S.C. 154(b) by 0 days.

(21) Appl. No.: 13/543,030

(22) Filed: Jul. 6, 2012

(65) Prior Publication Data

US 2013/0104471 A1    May 2, 2013

Related U.S. Application Data

(63) Continuation of application No. PCT/JP2011/075205, filed on Nov. 1, 2011.

(51) Int. Cl.
*E04D 13/18* (2006.01)
*H01L 31/042* (2006.01)

(52) U.S. Cl.
USPC ............. 52/173.3; 52/200; 136/251; 126/704

(58) Field of Classification Search
USPC .................... 52/173.3, 200, 198, 96, 94, 465, 52/468; 136/244, 291, 251; 126/623, 704
See application file for complete search history.

(56) References Cited

U.S. PATENT DOCUMENTS

| | | | | |
|---|---|---|---|---|
| 4,471,584 A | * | 9/1984 | Dietrich | 52/14 |
| 4,557,081 A | * | 12/1985 | Kelly | 52/94 |
| 5,740,647 A | * | 4/1998 | Kelly | 52/408 |
| 7,915,519 B2 | * | 3/2011 | Kobayashi | 136/251 |
| 8,171,689 B2 | * | 5/2012 | Pierson et al. | 52/461 |
| 2011/0314752 A1 | * | 12/2011 | Meier | 52/173.3 |
| 2012/0017526 A1 | * | 1/2012 | Eide | 52/173.3 |

FOREIGN PATENT DOCUMENTS

| JP | 09-256555 A | 9/1997 |
|---|---|---|
| JP | 2007-165499 A | 6/2007 |

OTHER PUBLICATIONS

International Search Report for PCT/JP2011/075205, mailing date of Dec. 6, 2011.

* cited by examiner

*Primary Examiner* — Phi A
(74) *Attorney, Agent, or Firm* — Westerman, Hattori, Daniels & Adrian, LLP

(57) ABSTRACT

A solar cell module securing structure includes a solar cell module, a first securing member that supports the solar cell module, a second securing member that includes an installation connecting portion having an installing portion on which the first securing member is installed, an inclined connecting portion extending from the installation connecting portion, and an abutting portion that is bent from the inclined connecting portion so as to extend along a structural surface of a roof structural member, and spacer members which are laminated between the first securing member and the second securing member at multiple stages. Further, a long hole portion having a long hole shape, which penetrates through the installing surface, is formed on the installing portion of the installation connecting portion, thereby making fine adjustment of a securing position of the first securing member with respect to the second securing member.

4 Claims, 6 Drawing Sheets

SOLAR CELL MODULE SECURING STRUCTURE

This application is a continuation of International Application No. PCT/JP2011/075205 filed on Nov. 1, 2011, of which full contents are incorporated herein by reference.

BACKGROUND OF THE INVENTION

1. Field of the Invention

The present invention relates to a solar cell module securing structure, in particular, relates to a solar cell module securing structure having a securing member for securing a plurality of solar cell modules onto roof.

2. Description of the Related Art

A solar cell module is installed on roof of a building and power is generated with sunlight. As a securing structure for securing a plurality of panel-like solar cell modules onto the roof, the following configuration is employed, for example. That is, roof securing clasps are mounted on a roofboard on which roof materials such as roof tiles are laid at a predetermined interval. Then, a plurality of lengthwise pieces is mounted on the roof securing clasps and a plurality of long lateral crosspieces is mounted at a predetermined interval so as to bridge across the lengthwise pieces. In such a manner, a mounting stand in a form of parallel crosses is formed. The solar cell modules are supported between the lateral crosspieces so as to be secured onto the roof. In this case, there has been a problem that various members such as the roof securing clasps and the lengthwise pieces are required so that the number of parts is increased, resulting in increase in facility cost. In addition, there has also arisen a problem that these members have to be assembled on the roof with a bad foothold so that an amount of man-hours is increased, resulting in increase in operation cost.

In order to solve the above problems, the present inventors have accelerated technological development relating to the solar cell module securing structure as described above. Further, the present inventors have proposed a securing structure which makes it possible to install a solar cell module on roof of a building easily at low cost without requiring a mounting stand in the form of parallel crosses. With this technique, outer edges of the solar cell module at an eaves side and a ridge side can be supported by a plurality of securing members and the securing members can be directly secured onto a roof structural member (roof material, building structural member, or the like) on which the solar cell module is to be installed (see, Patent Document 1; Japanese Patent Application Laid-open NO. 2007-165499). The securing structure is configured by including the securing members. Each securing member includes an installing portion on which the outer edge of the solar cell module is installed and a securing portion which is formed on a lower side of the installing portion and is a portion for securing the securing structure onto the roof material. Further, the securing member includes a base portion, an erected portion, and a blocking portion. The base portion is installed on the roof material. The erected portion extends from the installing portion of the base portion to the upper side. The blocking portion extends from an upper end of the erected portion to both sides so as to be in parallel with the installing portion. The securing member can sandwich and support the outer edge of the solar cell module by the installing portion and the blocking portion. With this securing structure, a plurality of solar cell modules can be secured from the one direction side (for example, eaves side) toward the other direction side (for example, ridge side) sequentially. This makes it possible to simplify an installing operation of the solar cell modules. Further, the securing members themselves are formed so as to be slidable along the outer edges of the solar cell modules. Therefore, securing positions thereof can be aligned with the building structural member of the roof, such as a rafter, so that installing strength of the securing members themselves can be enhanced. In addition, since an additional configuration such as the mounting stand is not needed, the number of parts can be largely reduced.

SUMMARY OF THE INVENTION

However, the solar cell module securing structure as described above possibly has the following problem. The securing members are secured directly onto the roof material so that operation efficiency can be enhanced and the number of parts can be reduced. However, a problem is generated when the solar cell module is exchanged in some case. The solar cell module is designed on an assumption of being used outside and essentially has performance of sufficient durability and water resistance higher than standard levels such that the solar cell module is durable even if it is exposed to rainwater and the like for a long period of time. However, when trees or the like flying due to typhoon or the like hit the solar cell module and a part or the entire of the solar cell module is damaged, an operation of exchanging the solar cell module for a new solar cell module is required. Alternatively, when estimated usage lifetime of the solar cell module has passed and power generation performance thereof is deteriorated so that a sufficient power generation amount cannot be obtained, the above exchange operation is also required.

In this case, the securing members connecting the roof structural member and the solar cell module need to be detached when the solar cell module is directly installed on the roof structural member through the securing members. The securing members are secured onto the roof structural member by using securing screws or the like, and securing screw holes bored by the securing screws are left after the securing members have been detached. When damaged or old solar cell module is exchanged for a new solar cell module and the new solar cell module is secured onto the roof structural member by using the securing members and the securing screws again, the securing screws are not fastened at the same positions as the securing screw holes used before in many cases in terms of installation strength. Therefore, new securing screw holes are bored at positions on the roof material every time the solar cell module is exchanged, resulting in disfigurement of the roof structural member itself in some cases. Further, if a plurality of holes (securing screw holes) are provided on the roof structural member, rainwater and the like flowing down the roof material become easy to enter an inner portion of the roof structural member. This arises a problem that strengths of the roof structural member itself and the building are deteriorated.

In view of the above circumstances, an object of the present invention is to provide a solar cell module securing structure which makes it possible to make an installing operation of a solar cell module easy and does not damage a roof material and the like when the solar cell module is mounted and exchanged.

In order to achieve the above object, a solar cell module securing structure (hereinafter, simply referred to as "securing structure") according to an aspect of the invention "includes a solar cell module that has a rectangular solar cell panel and a frame body which makes contact with a panel outer circumference of the solar cell panel, a first securing member that has a frame body connecting portion which is connected to the frame body of the solar cell module and a base portion which is formed at a lower-side position of the frame body connecting portion, a second securing member that is inserted between the first securing member and a roof structural member on which the solar cell module is to be installed, wherein the second securing member includes an installation connecting portion that has an installing portion having an installing surface on which the base portion of the first securing member is installed and a vertical leg portion which is bent from an eaves-side installing side of the installing portion in an orthogonal direction and holds the installing portion at a predetermined height from a structural surface of the roof structural member, and supports the first securing member from the lower side, an inclined connecting portion that has an inclined portion which is bent and extends from a ridge-side installing side of the installing portion of the installation connecting portion in a diagonal direction, and an inclined leg portion which connects the inclined portion and the structural surface, and an abutting portion that is bent and extends from a ridge-side inclined side of the installing portion in a diagonal direction along the structural surface and has an abutting surface which abuts against the structural surface".

The roof structural member is a member corresponding to a roof portion of a building on which the solar cell module is to be installed. For example, the roof structural member collectively indicate roof materials such as "slate", "ceramic roof tile", "metal roof tile", "cement roof tile", and "zinc roof", and building structural members which support the above roof materials, such as "rafter", "roofboard", "lateral crosspiece bridged on rafter", and "roof purlin". That is, it is sufficient that the solar cell module securing structure according to the invention has a configuration in which the solar cell module is secured onto any of the roof material and the building structural member through the first securing member and the second securing member. Further, the first securing member connects the solar cell module and the second securing member and holds the solar cell module in a state of keeping it at a predetermined height from a structural surface of the roof structural member. The first securing member in the aspect of the invention corresponds to a configuration of a "securing member" in the conventional solar cell module securing structure as described above. The first securing member has a configuration of a frame body connecting portion which sandwiches and holds the frame body of the solar cell module from upper and lower directions for connection, and the like. It is to be noted that since the details of configurations and connections of the solar cell module and the first securing member (corresponding to securing member) are well known, detail explanation thereof is not described.

On the other hand, the second securing member is inserted between the first securing member and the roof structural member. Three configurations of an installation connecting portion, an inclined connecting portion, and an abutting portion are formed on the second securing member so as to be lined from the ridge side toward the eaves side along a roof inclined direction of the roof structural member. The installation connecting portion includes an installing portion having an installing surface which abuts against a base portion bottom surface of the base portion of the first securing member. The installation connecting portion can hold the first securing member in a state of keeping the first securing member at a predetermined height from the structural surface. The height is determined mainly by a length of the vertical leg portion orthogonal to the ridge-side installing side of the installing portion. That is to say, the installation connecting portion is formed by a flat plate-like member and includes the vertical leg portion which is arranged along the direction orthogonal to the structural surface, and the installing portion which is bent from an upper end of the vertical leg portion in the orthogonal direction. Further, the installation connecting portion has a cross section of an L shape when seen from the side. It is to be noted that a bottom end of the vertical leg portion abuts against the structural surface only and is not fastened and secured between the vertical leg portion and the structural surface at the abutting position. With the configuration of the installation connecting portion, the installing surface of the installing portion and the structural surface are kept to be parallel with each other so that the base portion of the first securing member can be installed on the installing surface.

On the inclined connecting portion, the inclined portion on which the inclined surface is formed is bent and extends from the ridge-side installing side of the installing portion toward the structural surface in a diagonal direction and the inclined leg portion which is orthogonal to the inclined surface of the inclined portion is provided along the direction toward the structural surface. With this, the inclined connecting portion and the extended installation connecting portion are supported through the inclined leg portion. It is to be noted that a securing screw hole is provided on the inclined leg portion so as to penetrate therethrough along a leg direction. A securing screw is inserted into the securing screw hole and is secured to the roof structural member so that the second securing member is secured to the roof structural member.

Further, on the second securing member, the flat plate-like abutting portion that has the abutting surface which abuts against the structural surface is provided at the ridge side of the inclined connecting portion. It is to be noted that a securing screw hole which penetrates through the abutting surface is also provided on the abutting portion in the same manner as that provided on the above inclined leg portion of the inclined connecting portion. With this, the roof structural member and the abutting portion are secured to each other with the securing screw. That is to say, in the aspect of the invention, the second securing member is secured to the roof structural member at two positions of the inclined leg portion and the abutting portion. Note that the penetrating directions of the securing screw holes provided on the inclined leg portion and the abutting portion are orthogonal to the inclined surface and the abutting surface, respectively. Therefore, the penetrating directions of the securing screw holes are farther from each other toward front ends of the securing screw holes (to the side of the structural surface). Accordingly, when the second securing member is secured to the structural surface of the inclined roof structural member, securing strength can be significantly enhanced more than usual with one pair of securing screws exhibiting maximum load capacity in different directions and securing screws to be inserted therethrough.

Accordingly, with the securing structure according to the aspect of the invention, the second securing member is inserted between the first securing member and the roof structural member. Therefore, when the solar cell module is exchanged, a fastened state between the second securing member and the first securing member is released so that the solar cell module can be detached from the roof structural member. As a result, the second securing member is kept to be secured to the structural surface. Therefore, a new securing screw hole is not required to be formed when a solar cell module is installed again. Accordingly, an unnecessary securing screw hole is not present on the structural surface of the roof structural member, thereby preventing the roof structural member itself from being damaged. In addition, a part of the second securing member has the inclined surface which is inclined with respect to the structural surface. This makes it possible to perform an installing operation of the solar cell module easily by using the inclined surface. That is to say, when the solar cell module is sequentially from the eaves side in general, the frame body of the solar cell module is moved along the inclined surface of the inclined connecting portion constituting the second securing member. Then, the frame body can be fitted into the frame body connecting portion of the first securing member so as to be sandwiched and held thereby. This makes it possible to make the installing operation of the solar cell module easy.

Further, the securing structure according to the aspect of the invention may have a configuration in which "the installation connecting portion further includes a long hole portion having a long hole shape that penetrates through the installing portion, and extends along the roof inclined direction connecting an eaves side and a ridge side of the roof structural member, a fastener securing bolt which is capable of being inserted through the long hole portion and a nut which is fastened to the fastener securing bolt, and is capable of adjusting a securing position of the first securing member with respect to the second securing member along the roof inclined direction" in addition to the above configuration.

Accordingly, with the securing structure according to the aspect of the invention, the long hole portion having the long hole shape is provided on the installation connecting portion of the second securing member. Note that the first securing member is installed on the second securing member so as to be supported thereby. With the long hole portion, an installation position (securing position) of the first securing member on the second securing member can be freely displaced along a direction connecting an eaves and a ridge of a roof inclined surface. As a result, the securing position of the first securing member (eventually, solar cell module) can be easily adjusted. In particular, a plurality of solar cell modules are installed on the structural surface of the roof structural member in a matrix form and a lot of work is required for an adjustment operation of aligning positions of the solar cell modules in the vertical direction and the lateral direction to one another. In this case, since the long hole portion is provided on the installing portion, fine adjustment of the position particularly in the vertical direction (corresponding to eaves-ridge direction) is made easy so that the solar cell modules can be installed on the roof structural member in a state of being aligned regularly. It is to be noted that the long hole portion of the installation connecting portion has an advantage that the above adjustment can be made easy not only in a case where a solar cell module is newly installed on a roof surface but also in a case where a solar cell module is detached once for maintenance and is mounted again.

Further, the securing structure according to the aspect of the invention may have a configuration in which "a spacer member that has a rectangular shape and is inserted between the base portion and the installing portion so as to be laminated at multiple stages is further provided, the spacer member includes a notch portion that is notched from an eaves-side spacer side of the spacer member so as to have such width that a bolt shaft of the fastener securing bolt is capable of being inserted through the notch portion, a step portion that is formed on a side upper end of a ridge-side spacer side of the spacer member, and a hooking portion that is formed on a side lower end of the ridge-side spacer side so as to match with a step shape of the step portion, and the second securing member further includes a second securing step portion that is formed on the ridge-side installing side so as to match with a shape of the hooking portion" in addition to the above configuration.

The spacer member is formed by a flat plate-like member having a rectangular shape and a predetermined thickness (for example, approximately 3 mm). Further, the notch portion that is notched from one long side (eaves-side spacer side) of the spacer member toward a center is formed on the spacer member. Then, the bolt shaft of the above fastener securing bolt is inserted through the notch portion so that the first securing member and the second securing member are connected and secured to each other by the fastener securing portion with no hindrance. On the other hand, the step portion having the step shape is provided at the side upper end of the other long side (ridge-side spacer side) opposed to the eaves-side spacer side. Further, the hooking portion corresponding to the step portion is formed on the side lower end thereof. As a result, even when a plurality of spacer members are laminated at multiple stages, the hooking portion of the spacer member at the upper side can be hooked with the step portion of the spacer member at the lower side. Note that the second securing member is mounted on the structural surface of the inclined roof structural member. A state where the spacer member at the upper stage is hooked and laminated on the spacer member at the lower stage can be kept with the hooking between the spacer members. This makes it possible to install the spacer members each having a predetermined thickness on the first securing member and the second securing member at a plurality of stages and perform fine adjustment in the height direction when the solar cell module is installed. In addition, the spacer member can be hooked with the second securing member with the second securing step portion provided on the ridge-side installing side of the second securing member.

Accordingly, with the securing structure according to the aspect of the invention, a distance between the first securing member and the second securing member can be adjusted by using the spacer member so that an installation height of the solar cell module can be finely adjusted. Further, as the spacer member having the step portion and the hooking portion is employed, even when a plurality of spacer members are laminated, the spacer members can be restricted from rotating around the bolt shaft of the fastener securing bolt. This makes it possible to make an insertion operation of the spacer members and an installing operation of the solar cell module easy.

BRIEF DESCRIPTION OF THE DRAWINGS

FIG. 4A is a front view, FIG. 4B is a plan view, and FIG. 4C is a left side view.

FIG. 5A is a front view, FIG. 5B is a plan view, and FIG. 5C is a left side view.

DESCRIPTION OF EXEMPLARY EMBODIMENTS

Figure 1:
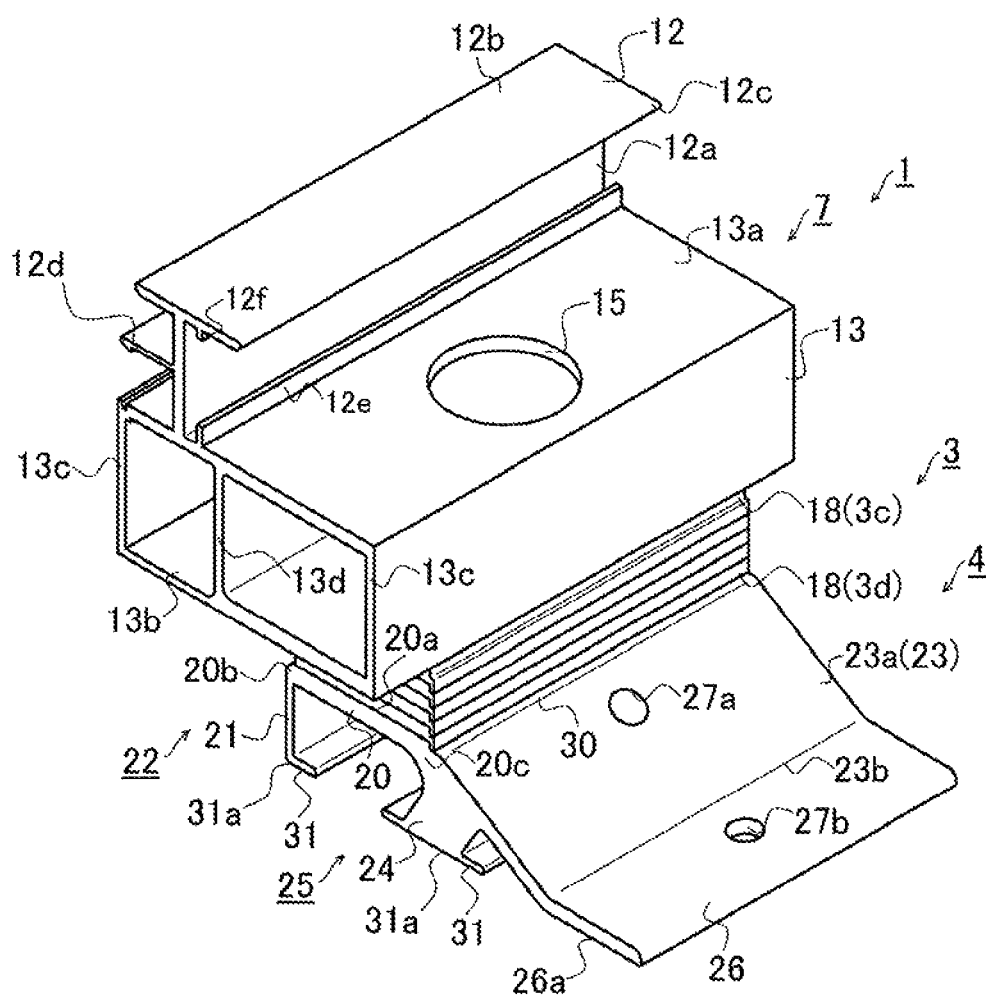
FIG. 1 is a perspective view illustrating a schematic configuration of a securing structure according to the embodiment.

Hereinafter, a securing structure 1 (solar cell module securing structure) as an embodiment of the invention is described with reference to FIG. 1 to FIG. 6. As the securing structure 1 according to the embodiment, a securing structure used when a solar cell module 9 is installed on roof (roof structural member 2) constituted by laying a roof material 6 on a building structural member 5 such as a roofboard and a rafter is described as an example, as illustrated in FIG. 2 and the like. To be more specific, the solar cell module 9 is installed on an inclined structural surface 8 of the roof structural member 2 by using a first securing member 7 and the second securing member 4. It is to be noted that a configuration of the solar cell module 9 including frame bodies 11 and the like is not illustrated in the drawings if necessary for simplifying the explanation.

Figure 2:
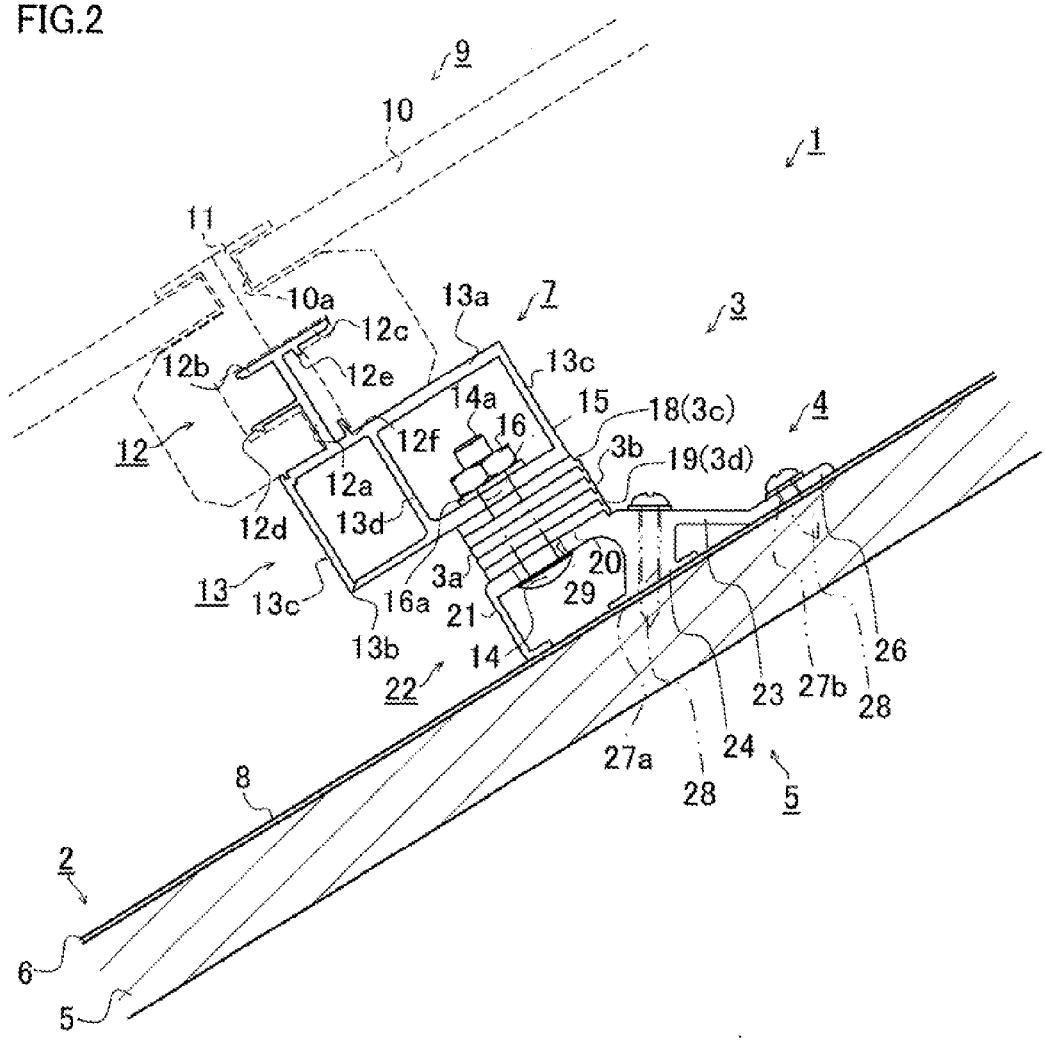
FIG. 2 is a descriptive view illustrating a state where the securing structure is installed on a roof structural member when seen from the side.
Figure 3:
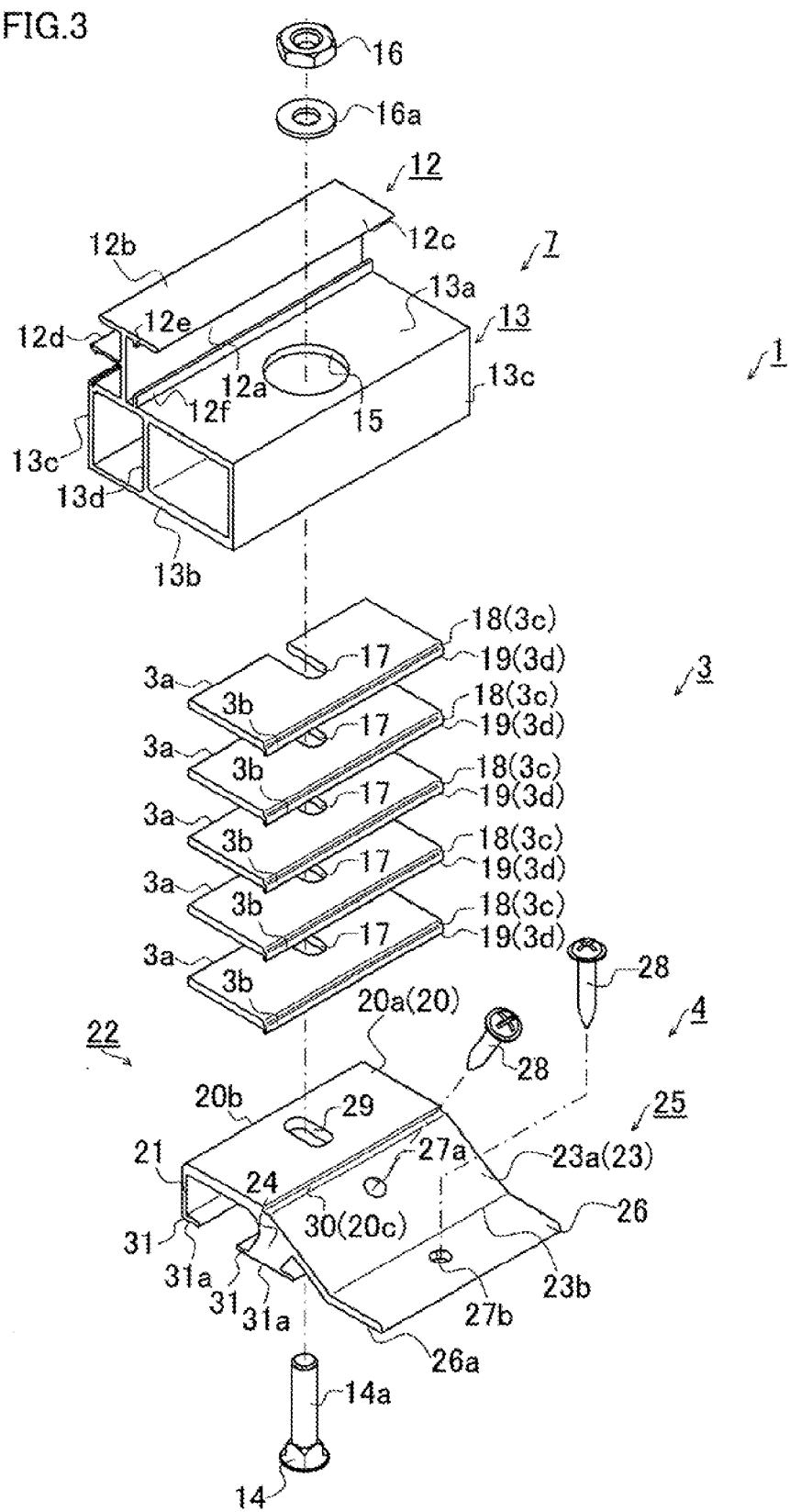
FIG. 3 is an exploded perspective view illustrating the schematic configuration of the securing structure.

As illustrated in FIG. 1 and the like, the securing structures 1 according to the embodiment are configured by mainly including the solar cell module 9 formed in a rectangular shape, the plurality of first securing members 7, the second securing members 4, and the plurality of spacer members 3. The first securing members 7 support the frame bodies 11 of the solar cell module 9 at a ridge side and an eaves side. The second securing members 4 are secured to the roof structural member 2. The spacer members 3 are inserted between the first securing members 7 and the second securing members 4 in a laminated manner at multiple stages.

The solar cell module 9 has a substantially rectangular shape when seen from the above. The solar cell module 9 is configured by mainly including a solar cell panel 10 and the frame bodies 11. The solar cell panel 10 has solar cells (not illustrated) which generate power by receiving sunlight. The frame bodies 11 hold panel outer circumferences of the solar cell panel 10. The frame bodies 11 are formed so as to be fitted to frame body connecting portions 12 of the first securing members 7, which will be described later. It is to be noted that as configurations of the solar cell module 9, the frame bodies 11, and the like, those which are conventionally well known can be used, and explanation of details thereof such as shapes is not given.

As illustrated in FIG. 2 and the like, each first securing member 7 is configured by mainly including a frame body connecting portion 12 and a base portion 13. The frame body connecting portion 12 supports the frame body 11 of the solar cell module 9. The base portion 13 is provided at a lower side position of the frame body connecting portion 12 and is secured through the second securing member 4 and the plurality of spacer members 3. As will be described in detail, the base portion 13 exhibits a square cylindrical form having a rectangular cross-sectional shape when seen from the side, and is configured by including a base portion upper surface portion 13a, a base portion bottom surface portion 13b, a pair of base portion side surface portions 13c, and a reinforcing leg portion 13d. The base portion side surface portions 13c connect both ends of the base portion upper surface portion 13a and the base portion bottom surface portion 13b. The reinforcing leg portion 13d connects center portions of the base portion upper surface portion 13a and the base portion bottom surface portion 13b. It is to be noted that a bolt hole 15 is bored on the base portion bottom surface portion 13b at the ridge side as partitioned by the reinforcing leg portion 13d. A bolt shaft 14a of a fastener securing bolt 14 used for fastening and securing to the second securing member 4, which will be described later, can be inserted through the bolt hole 15. That is to say, a nut 16 for fastening and securing can be inserted into a space (upper portion of the bolt hole 15) at the ridge side as partitioned by the reinforcing leg portion 13d. Note that the fastener securing bolt 14 and the nut 16 correspond to a fastener securing portion according to the invention.

On the other hand, the frame body connecting portion 12 is configured by mainly including an erected portion 12a, a pair of horizontal extending portions 12b, 12c, a projecting portion 12d, and a pair of frame body engaging projections 12e, 12f. The erected portion 12a is provided at an eaves side position as partitioned by the reinforcing leg portion 13d of the base portion 13 and is erected from the base portion upper surface portion 13a in the vertical direction. The horizontal extending portions 12b, 12c are provided to extend from a front end of the erected portion 12a to the eaves side and the ridge side in the horizontal direction, respectively. The projecting portion 12d is formed between the horizontal extending portion 12b and the base portion upper surface portion 13a at the eaves side so as to project from an intermediate position of the erected portion 12 to the eaves side in the horizontal direction. A front end of the projecting portion 12d is formed into a hook-like shape. The frame body engaging projections 12e, 12f project from a position on a lower surface of the horizontal extending portion 12c at the ridge side and a position on the base portion upper surface portion 13a of the base portion 13, respectively, which are opposed to each other. As the configuration is employed, the frame bodies 11 of the solar cell module 9 at the eaves side and the ridge side can be fitted to the frame body connecting portions 12 so as to be held. The first securing member 7 is formed with a metal material such as aluminum. Further, the plurality of the first securing members 7 are installed along a lengthwise direction (depth direction of a paper plane of FIG. 2) of the frame body 11 of the solar cell module 9.

Figure 4A:
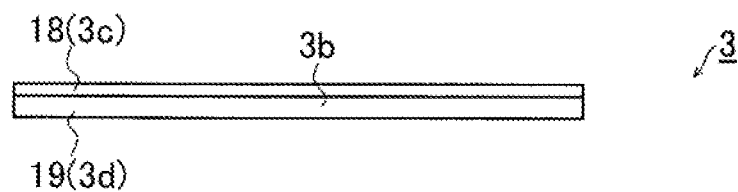
FIGS. 4A-4C are views illustrating a configuration of a spacer member.
Figure 4B:
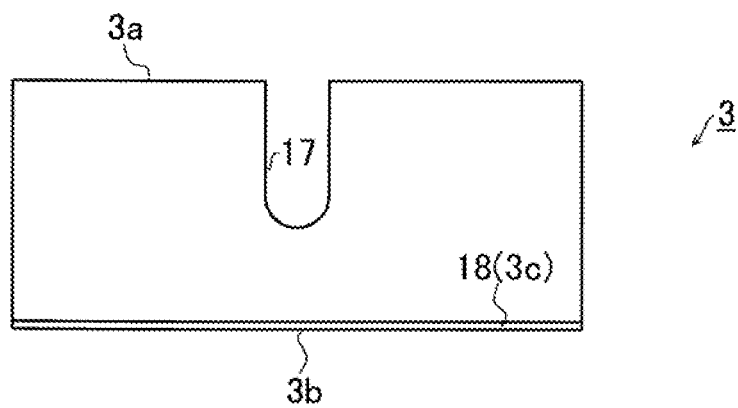
Figure 4C:
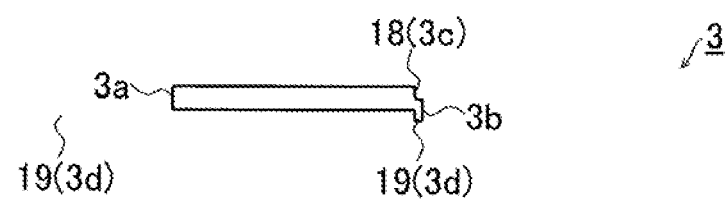

As mainly illustrated in FIGS. 4A-4C and the like, each spacer member 3 is configured into a flat plate form having a substantially rectangular shape and has a notch portion 17 having a semielliptical shape, which is notched from an eaves-side spacer side 3a toward a center portion. A notch width of the notch portion 17 is set to be substantially equal to a shaft diameter of the bolt shaft 14a of the fastener securing bolt 14 as described above. Further, in the securing structure 1 according to the embodiment, the thickness of each spacer member 3 is set to approximately 3 mm and four spacer members 3 are used. On the other hand, a step portion 18 formed into a step-like form by cutting a corner portion into a square shape is provided on a side upper end 3c of a ridge-side spacer side 3b of the spacer member 3. Further, a hooking portion 19 which projects to the lower side from the ridge-side spacer side 3b of the spacer member 3 is provided on a lower end 3d of the ridge-side spacer side 3b so as to match with the step-like shape of the above step portion 18. With this, when the plurality (four in the embodiment) of spacer members 3 are laminated at multiple stages as illustrated in FIG. 2, they are laminated on one another in the following state. That is, the step portions 18 and the hooking portions 19 of the spacer members 3 at the upper side and the lower side are hooked with each other. Further, an upper surface and a lower surface of the spacer members 3 make close contact with each other with no space therebetween and the side positions of the ridge-side spacer sides 3b of the spacer members 3 are aligned in the vertical direction. It is to be noted that the spacer member 3 located at an uppermost stage among the laminated space members abuts against the base portion bottom surface portion 13b of the first securing member 7 while the spacer member 3 located at a lowermost stage abuts against an installing surface 20a of an installing portion 20 of a second securing member 4, which will be described later. The spacer members 3 are formed such that abutting areas of an upper surface and a lower surface of the abutting spacer members 3 are substantially equal to an area of the base portion bottom surface portion 13b at the ridge side as partitioned by the reinforcing leg portion 13d and an area of the installing surface 20a of the installing portion 20, respectively.

As illustrated in FIG. 2 and the like, each second securing member 4 is configured by including an installation connecting portion 22, an inclined connecting portion 25, and an abutting portion 26. The installation connecting portion 22 includes the installing portion 20 and a vertical leg portion 21 and supports the first securing member 7 from the lower side. The installing portion 20 has the installing surface 20a on which the base portion 13 of the first securing member 7 is installed through the above spacer members 3. The vertical leg portion 21 is bent from an eaves-side installing side 20b of the installing portion 20 in an orthogonal direction and holds the installing portion 20 at a predetermined height from the structural surface 8 of the roof structural member 2. The inclined connecting portion 25 includes an inclined portion 23 and an inclined leg portion 24. The inclined portion 23 is bent and extends from a ridge-side installing side 20c of the installing portion 20 toward the structural surface in a diagonal direction. The inclined leg portion 24 is provided between the inclined portion 23 and the structural surface 8 and projects from the inclined surface 23a of the inclined portion 23 toward the structural surface 8 in the orthogonal direction. The abutting portion 26 is bent and extends from the ridge-side inclined side 23b of the inclined portion 23 in a diagonal direction along the structural surface 8, and has an abutting surface 26a which abuts against the structural surface 8. Note that the installation connecting portion 22, the inclined connecting portion 25, and the abutting portion 26 of the second securing member 4 are formed with a metal material such as aluminum as in the first securing member 7 and are integrally formed. The second securing member 4 includes an inclination securing screw hole 27a and an abutment securing screw hole 27b. The inclination securing screw hole 27a is formed so as to penetrate through the inclined leg portion 24 from the inclined portion 23. The abutment securing screw hole 27b is formed so as to penetrate through the abutting portion 26. The second securing member 4 is secured to the roof structural member 2 by using the screw hole 27a, 27b and the securing screw 28. Further, a long hole portion 29 having a long hole shape is provided on the second securing member 4 so as to penetrate through the installing surface 20a of the installing portion 20 of the installation connecting portion 22. It is to be noted that the long hole portion 29 exhibits a substantially elliptical shape and a long circle direction is identical to a direction connecting the eaves side and the ridge side of the roof structural member 2 (corresponding to up-down direction of a paper plane of FIG. 5B.

Figure 5A:
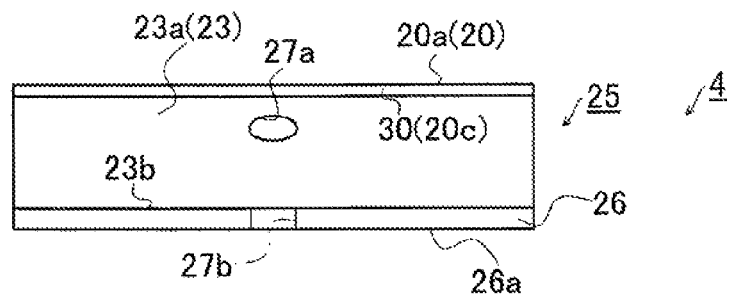
FIGS. 5A-5C are views illustrating a configuration of a second securing member.
Figure 5B:
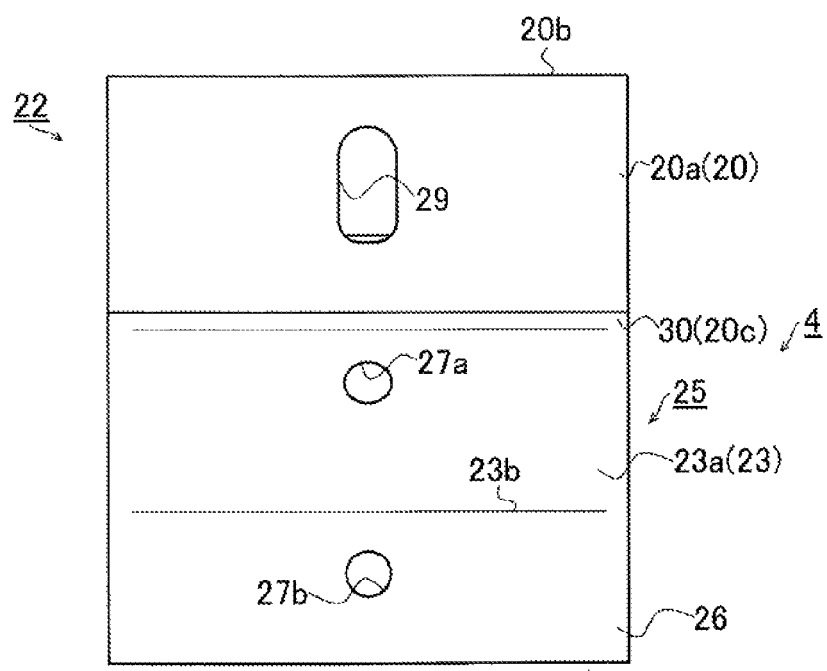
Figure 5C:
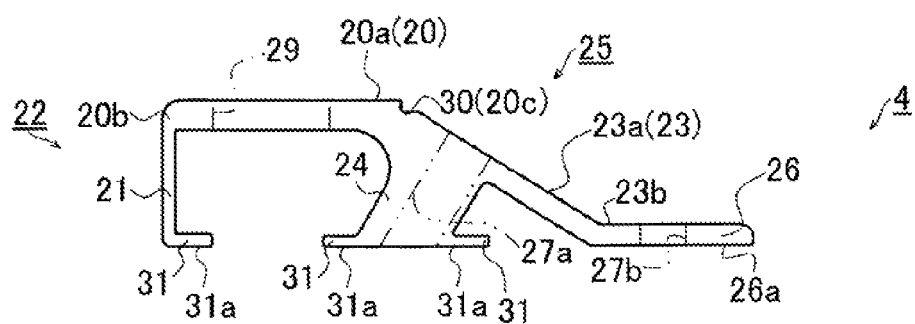
Figure 6:
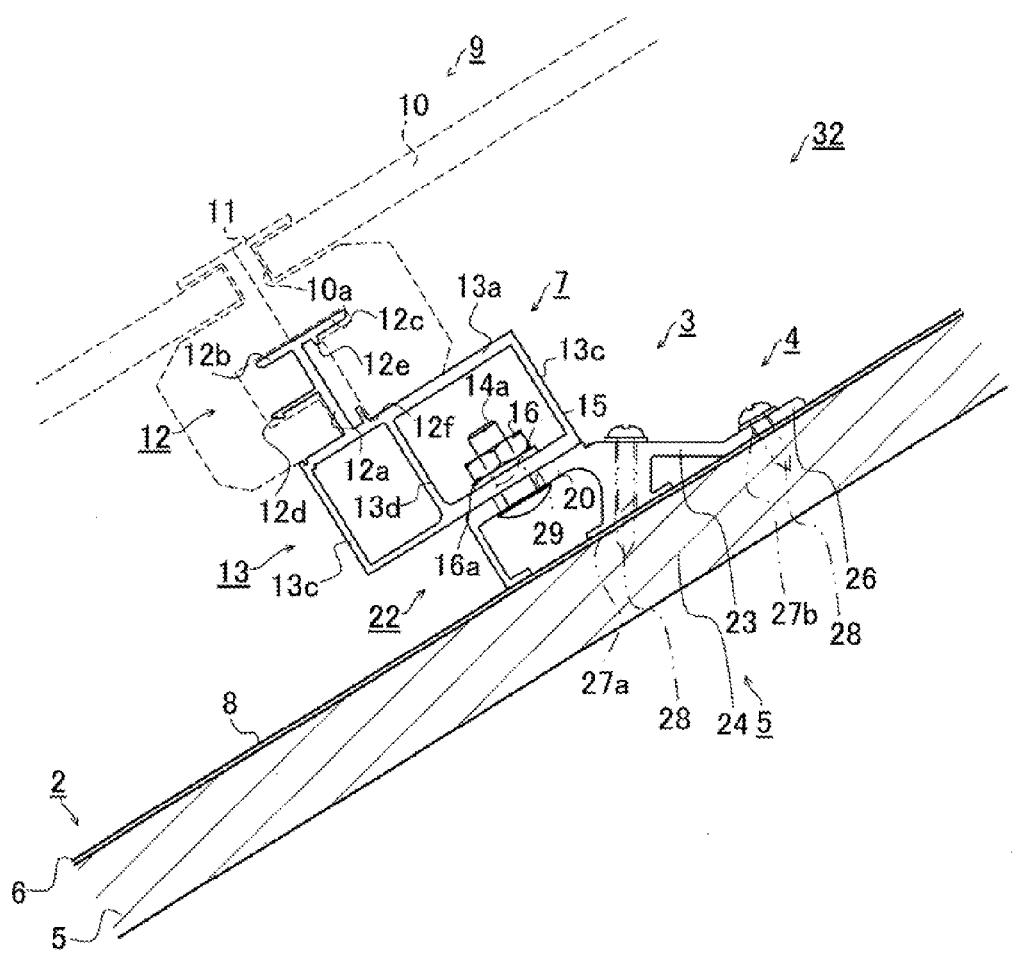
FIG. 6 is a perspective view illustrating another example of a configuration of a securing structure according to the invention.

Further, on the second securing member 4, a second securing step portion 30 is provided on the ridge-side installing side 20c of the installing portion 20 of the installation connecting portion 22, as another configuration. The second securing step portion 30 matches with the shape of the hooking portion 19 of the spacer member 3. The spacer member 3 can be easily hooked on the second securing member 4 by hooking the hooking portion 19 of the spacer member 3 on the second securing step portion 30. Note that the step portion 18 and the hooking portion 19 are formed along the ridge-side spacer side 3b on each spacer member 3 as described above. As illustrated in FIGS. 5A-5C, the second securing step portion 30 is also formed along the width direction of the second securing member 4 (corresponding to right-left direction of a paper plain of FIG. 5B and the like). Therefore, the above hooking restricts the spacer members 3 from rotating around the bolt shaft 14a of the fastener securing bolt 14. It is to be noted that leg projecting portions 31 are provided on the vertical leg portion 21 of the installation connecting portion 22 and the inclined leg portion 24 of the inclined connecting portion 25. The leg projecting portions 31 extend in the horizontal direction in order to increase contact areas with the structural surface 8. In this case, leg surfaces 31a of the leg projecting portions are formed on the same plane as the abutting surface 26a of the abutting portion 26.

Next, examples of installation and securing of the solar cell module 9 on the securing structures 1 according to the embodiment are described. At first, the plurality of second securing members 4 to be located at the eaves side are arranged at a predetermined interval along the lateral direction (depth direction of the paper plane of FIG. 2) so as to be secured onto the roof structural member 2. At this time, each second securing member 4 makes contact with the structural surface 8 of the roof structural member 2 at three portions along from the eaves side to the ridge side. The three portions are the leg surface 31a of the leg projecting portion 31 of the vertical leg portion 21 of the installation connecting portion 22, the leg surface 31a of the leg projecting portion 31 of the inclined leg portion 24 of the inclined connecting portion 25, and the abutting surface 26a of the abutting portion 26. Then, the securing screws 28 are inserted into the screw holes 27a, 27b bored on the inclined leg portions 24 and the abutting portions 26 from the upper side and front ends of the securing screws 28 are threaded into the secured roof structural member 2 so as to be secured. As a result, the second securing members 4 are secured in states of being along the inclined structural surface 8. At this time, boring directions of the screw holes 27a, 27b become farther from each other (see, FIG. 2 and the like). Therefore, two securing screws 28 which are inserted into the screw holes 27a, 27b and secured to the roof structural member 2 also become farther from each other toward the front ends of the screws when seen from the side. That is to say, one securing screws 28 arranged at the ridge side are secured so as to be orthogonal to the abutting surfaces 26a of the abutting portions 26 and be also orthogonal to the structural surface 8 of the roof structural member 2. On the other hand, the other securing screws 28 arranged at the eaves side are secured in the diagonal direction along the screw holes 27a bored on the inclined leg portions 24. More in detail, the other securing screws 28 are secured in a state where front ends of the screws direct to the eaves side with respect to head portions of the securing screws 28. As a result, even when large load is applied from the ridge side to the eaves side, load capacity can be improved in comparison with a case where both of one pairs of securing screws 28 are secured in the directions orthogonal to the structural surface 8. Accordingly, the solar cell module 9 and the like to be installed on the roof can be sufficiently supported. In particular, when a plurality of solar cell modules 9 are installed on the roof in a matrix form, large load is applied to the second securing members 4 installed at the lowermost stage at the eaves side. The securing structures 1 according to the embodiment make it possible to sufficiently cope with such situation with the arrangement of the screw holes 27a, 27b and one pairs of the securing screws 28.

After the second securing members 4 have been secured onto the roof structural member 2, the spacer members 3 are installed on the installing surfaces 20a of the installing portions 20 of the second securing members 4 in a laminated manner. To be more specific, the hooking portions 19 which are provided on the ridge-side spacer sides 3b of the rectangular spacer members 3 so as to project to the lower side in hook forms (or L-shaped forms) are hooked on the second securing step portions 30 of the second securing members 4. At this time, the second securing members 4 themselves are inclined along the structural surface 8 of the roof structural member 2 as described above. Accordingly, the spacer members 3 in a state where the hooking portions 19 are hooked on the second securing step portions 30 are restricted from sliding down to the eaves side under their own weight by the hooking portions 19 and the second securing step portions 30, thereby keeping the hooked states. Further, as illustrated in FIGS. 4A-4C and FIGS. 5A-5C, the hooking portions 19 and the second securing step portions 30 are provided along the sides of the spacer members 3 and the sides of the second securing members 4, respectively. Therefore, the spacer members 3 are restricted from swinging in the lengthwise directions (depth direction of the paper plane of FIG. 2). This makes the hooked states stable. In particular, the spacer members 3 can be restricted from rotating around the bolt shafts 14a of the fastener securing bolts 14, which will be described later.

As in the same manner as the installation of the spacer members 3 on the second securing members 4, other spacer members 3 are laminated on the installed spacer members 3 at the lowermost positions. At this time, the step portions 18 and the hooking portions 19 of the spacer members 3 are formed to match with each other. Therefore, as illustrated in FIG. 2 and the like, a state where four spacer members 3 are laminated on the installing surfaces 20a of the installing portions 20 of the second securing members 4 at multiple stages can be kept. At this time, adjustment in the lateral direction (corresponding to depth direction of the paper plane of FIG. 2) is made such that positions of the notch portions 17 provided on the spacer members 3 are aligned with one another.

Thereafter, the bolt shafts 14a of the fastener securing bolts 14 are installed from a space at the rear surface side of the installing surfaces 20a of the installing portions 20 of the second securing members 4 so as to penetrate through the installing portions 20 and the spacer members 3. Note that the long hole portions 29 having long hole shapes through which the bolt shafts 14a can be inserted are provided on the installing portions 20 and the notch portions 17 which are notched from the eaves-side spacer sides 3a are formed on the spacer members 3. Therefore, the fastener securing bolts 14 can be installed in the above manner. Then, the base portion bottom surface portions 13b of the base portions 13 of the first securing members 7 are installed on the upper surfaces of the spacer member 3 located at the upper most stages. At this time, the positions of the bolt shafts 14a of the fastener securing bolts 14 and the bolt holes 15 which are provided on the base portion bottom surface portions 13b so as to penetrate therethrough are made to match with each other so that the front ends of the bolt shafts 14a are made to exit from the bolt holes 15. Then, the nuts 16 are mounted on the front ends of the bolt shafts 14a through washers 16a so as to be screwed. With this, the installing portions 20 of the installation connecting portions 22, the four spacer members 3, and the base portion bottom surface portions 13b can be secured in a state of being sandwiched between the bolt head portions (not illustrated) of the fastener securing bolts 14 and the nuts 16. With this, the first securing members 7 and the second securing members 4 are completely secured. At this time, the first securing members 7 are adjusted such that the base portion bottom surface portions 13b on which the frame body connecting portions 12 are installed are located at the eaves side with respect to the base portion bottom surface portions 13b at the ridge side which are partitioned by the reinforcing leg portions 13d and on which the bolt holes 15 are bored. In the securing structures 1 according to the embodiment, the spacer members 3 each having the thickness of 3 mm are used so that height adjustment of 1.2 cm is made in total. The number of spacer members 3 to be used can be appropriately changed in accordance with an irregular shape of the roof structural member 2 on which the solar cell module 9 is to be installed.

The positions of the bolt shafts 14a can be moved along the long hole portions 29 provided on the installing portions 20 to the eaves side or the ridge side by making fastening with the fastener securing bolts 14 and the nuts 16 (corresponding to fastener securing portion) for securing the first securing members 7 and the second securing members 4 into a loosened state. This makes it possible to freely adjust the securing positions of the first securing members 7 with respect to the second securing members 4 (relative positional relationships) within a predetermined range. Accordingly, an installation position of the solar cell module 9 to be supported by the first securing members 7 can be finely adjusted to the eaves side or the ridge side. Therefore, mounting positions and the like of the plurality of solar cell modules 9 which are arranged on the roof structural member 2 in a matrix form can be adjusted so that the plurality of solar cell modules 9 can be aligned. It is to be noted that the adjustment can be made after the solar cell module 9 has been secured to the first securing members 7.

After the first securing members 7 have been secured to the second securing members 4, the frame bodies 11 of the solar cell module 9 are mounted on the frame body connecting portions 12 of the first securing members 7. Since details of the installation are conventionally well known, detail explanation thereof is not given. In the securing structures 1 according to the embodiment, the inclined connecting portions 25 of the second securing members 4 are provided such that the inclined portions 23 having the inclined surfaces 23a are located at the ridge side with respect to the installation positions of the first securing members 7 on which the frame body connecting portions 12 are provided. Therefore, when the solar cell module 9 is secured to the first securing members 7, the solar cell module 9 is moved from the ridge side to the eaves side first, thereby making the securing operation easy by using the inclined surfaces 23a. As will be described in detail, when the solar cell module 9 is installed, the inclined surfaces 23a and a part of the frame body 11 of the solar cell module 9 at the eaves side are made contact with each other so that the frame body 11 can be guided to the frame body connecting portions 12 while making the frame body 11 slide along the inclined surfaces 23a. In a case of a general securing installing operation, many irregularities are present on the roof structural member 2 and it has been difficult to move the solar cell module 9 to a desired position while making the solar cell module 9 slide on the structural surface 8. Therefore, a plurality of operators have gripped and totally lifted the solar cell module 9, and have moved the solar cell module 9 to the frame body connecting portions 12. On the other hand, in the case of the securing structures 1 according to the embodiment, the solar cell module 9 can be made closer to the first securing members 7 easily by making the solar cell module 9 slide along the inclined surfaces 23a. Therefore, the solar cell module 9 can be lifted in the vicinity of the inclined portions 23. This makes it possible to make the installing operation of the solar cell module 9 easy, thereby reducing load for operators. It is to be noted that the frame body 11 of the solar cell module 9 at the ridge side is also supported by using the second securing members 4 and the first securing members 7 in the same manner. With this, the solar cell module 9 is supported between the first securing members 7 and the second securing members 4 arranged at the eaves side and the ridge side in a state of being apart from the structural surface 8 by a predetermined height. It is to be noted that electric operations and the like to be performed on the solar cell module 9 which has been installed on the roof are not described.

As described above, with the securing structures 1 according to the embodiment, the first securing members 7 are secured onto the roof structural member 2 through the second securing members 4 and the spacer members 3 so that the roof structural member 2 is not directly damaged when the solar cell module 9 is exchanged. That is to say, in the exchange operation, the solar cell module 9 can be removed from the roof by releasing securing with the fastener securing portions of the securing bolts 14 and the nuts 16 which fasten the first securing members 7 and the second securing members 4 and detaching the first securing members 7 from the second securing members 4. As a result, holes for the securing screws 28 are not bored on the roof structural member 2 every exchange operation. Therefore, the roof structural member 2 is not disfigured and a possibility that rainwater and the like enter the roof structural member 2 can be suppressed. In addition, necessary adjustment can be made in accordance with an irregular shape of the structural surface of the roof structural member 2 on which the solar cell module 9 is to be installed by inserting the spacer members 3 between the first securing members 7 and the second securing members 4, thereby aligning the solar cell module 9 at a certain installation-height. Further, the spacer members 3 can be laminated at multiple stages in a state where the eaves-side spacer sides 3a and the ridge-side spacer sides 3b are aligned with the step portions 18 and the hooking portions 19, thereby preventing disfigurement when the spacer members 3 are installed. Further, the step portions 18 and the like can restrict the spacer members 3 from rotating around the bolt shafts 14a, thereby keeping the state where the spacer members 3 are inserted between the first securing members 7 and the second securing members 4 reliably. In addition, the installing operation of the solar cell module 9 can be made easy by using the inclined surfaces 23a of the inclined portions 23 of the inclined connecting portions 25. Moreover, positional adjustment of the solar cell module 9 can be made easy by using the long hole portions 29 of the installing portions 20.

Hereinbefore, the invention has been described by taking a preferred embodiment as an example. However, the invention is not limited to the embodiment and various improvements and changes in design can be made in a range without departing from a scope of the invention as follows:

That is to say, in the securing structure 1 according to the embodiment, four spacer members 3 are inserted between the first securing member 7 and the second securing member 4. However, the invention is not limited thereto. The number of spacer members 3 can be arbitrarily adjusted in accordance with an irregular shape and inclination of the roof structural member 2 on which the solar cell module 9 is to be installed. For example, as illustrated as another configuration example in FIG. 6, an installation configuration 32 of the solar cell module 9 without using the spacer member 3 may be employed. If the configuration is employed, the base portion bottom surface portion 13b of the first securing member 7 and the installing surface 20a of the installing portion 20 of the second securing member 4 make direct contact with each other. Therefore, the number of parts and an amount of man-hours are reduced, thereby reducing operation cost.

Further, in the securing structure 1 according to the embodiment, a case where the solar cell module 9 is newly installed has been described. However, the invention is not limited to the case. That is to say, the above excellent effects can be obtained in a case where the solar cell module 9 is detached once for performing a maintenance operation when a predetermined period of time has passed since the solar cell module 9 has been installed. In this case, the maintenance operation can be performed on the solar cell module 9 by leaving the second securing members 4 on the structural surface 8 of the roof structural member 2 as they are and detaching only the first securing members 7 and the solar cell module 9. Then, when the solar cell module 9 on which maintenance operation has been completely performed is installed on the roof again, relative positional relationship can be easily adjusted on a line (vertical direction) connecting the first securing members 7 and the second securing members 4 at the ridge side and the eaves side by using the long hole portions 29 provided on the installation connecting portions 22 of the second securing members 4. Therefore, the maintenance operation can be performed easily without damaging the roof structural member 2 and an operation time can be made shorter.

As effects of the invention, an installing operation of a solar cell module can be made easy and a possibility that a roof structural member is damaged when the solar cell module is exchanged can be suppressed by inserting a second securing member between a first securing member and a roof structural member.

What is claimed is:
1. A solar cell module securing structure, comprising:
a solar cell module that has a rectangular solar cell panel and a frame body which makes contact with a panel outer circumference of the solar cell panel;
a first securing member that has a frame body connecting portion which is connected to the frame body, and a base portion which is formed at a lower-side position of the frame body connecting portion; and
a second securing member that is inserted between the first securing member and a roof structural member on which the solar cell module is to be installed,
wherein the second securing member includes:
an installation connecting portion that has an installing portion having an installing surface on which the base portion is installed, and a vertical leg portion which is bent from an eaves-side installing side of the installing portion in an orthogonal direction and holds the installing portion at a predetermined height from a structural surface of the roof structural member, and is connected to the first securing member;
an inclined connecting portion that has an inclined portion which is bent and extends from a ridge-side installing side of the installing portion toward the structural surface in a diagonal direction, and an inclined leg portion which connects the inclined portion and the structural surface and projects from an inclined surface of the inclined portion toward the structural surface in an orthogonal direction;
an abutting portion that is bent and extends from a ridge-side inclined side of the installing portion in a diagonal direction along the structural surface and has an abutting surface which abuts against the structural surface;
an inclination securing screw hole which secures the second securing member to the roof structural member, and which penetrates through the inclined leg portion from the inclined portion; and
an abutment securing screw hole which secures the second securing member to roof structural member, and which penetrates through the abutting portion.

2. The solar cell module securing structure according to claim 1, wherein the installation connecting portion further includes:
- a long hole portion having a long hole shape that penetrates through the installing portion, and extends along the roof inclined direction connecting an eaves side and a ridge side of the roof structural member; and
- a fastener securing portion that has a fastener securing bolt which is capable of being inserted through the long hole portion and a nut which is fastened to the fastener securing bolt, and connects the first securing member and the second securing member while adjusting a securing position of the first securing member with respect to the second securing member along the roof inclined direction.

3. The solar cell module securing structure according to claim 1, further including a spacer member that has a rectangular shape and is inserted between the base portion and the installing portion so as to be laminated at multiple stages,
wherein the spacer member includes:
- a notch portion that is notched from an eaves-side spacer side of the spacer member so as to have such width that a bolt shaft of the fastener securing bolt is capable of being inserted through the notch portion;
- a step portion that is formed on a side upper end of a ridge-side spacer side of the spacer member; and
- a hooking portion that is formed on a side lower end of the ridge-side spacer side so as to match with a step shape of the step portion, and
wherein the second securing member further includes a second securing step portion that is formed on the ridge-side installing side so as to match with a shape of the hooking portion.

4. A solar cell module securing structure, comprising:
- a solar cell module that has a rectangular solar cell panel and a frame body which makes contact with a panel outer circumference of the solar cell panel;
- a first securing member that has a frame body connecting portion which is connected to the frame body, and a base portion which is formed at a lower-side position of the frame body connecting portion;
- a second securing member that is inserted between the first securing member and a roof structural member on which the solar cell module is to be installed; and
- a spacer member that has a rectangular shape and is inserted between the first securing member and the second securing member so as to be laminated at multiple stages,
wherein the second securing member includes:
- an installation connecting portion that has an installing portion having an installing surface on which the base portion is installed, and a vertical leg portion which is bent from an eaves-side installing side of the installing portion in an orthogonal direction and holds the installing portion at a predetermined height from a structural surface of the roof structural member, and is connected to the first securing member;
- an inclined connecting portion that has an inclined portion which is bent and extends from a ridge-side installing side of the installing portion in a diagonal direction, and an inclined leg portion which connects the inclined portion and the structural surface;
- an abutting portion that is bent and extends from a ridge-side inclined side of the installing portion in a diagonal direction along the structural surface and has an abutting surface which abuts against the structural surface; and
- a second securing step portion that is formed on the ridge-side installing side so as to match with a shape of the hooking portion,
wherein the spacer member includes:
- a notch portion that is notched from an eaves-side spacer side of the spacer member so as to have such width that a bolt shaft of the fastener securing bolt is capable of being inserted through the notch portion;
- a step portion that is formed on a side upper end of a ridge-side spacer side of the spacer member; and
- a hooking portion that is formed on a side lower end of the ridge-side spacer side so as to match with a step shape of the step portion, and
wherein the spacer member is inserted between the base portion of the first securing member and the installing portion of the second securing member.

* * * * *